(12) United States Patent
Venkiteswaran et al.

(10) Patent No.: US 10,447,672 B2
(45) Date of Patent: Oct. 15, 2019

(54) FACILITATING ENCRYPTED PERSISTENT STORAGE IN BROWSERS

(71) Applicant: salesforce.com, inc., San Francisco, CA (US)

(72) Inventors: Kevin Venkiteswaran, Alameda, CA (US); Sergey Gorbaty, Emeryville, CA (US); Bob Yao, Daly City, CA (US); Trevor James Bliss, Oakland, CA (US)

(73) Assignee: salesforce.com, inc., San Francisco, CA (US)

(*) Notice: Subject to any disclaimer, the term of this patent is extended or adjusted under 35 U.S.C. 154(b) by 153 days.

(21) Appl. No.: 15/482,638

(22) Filed: Apr. 7, 2017

(65) Prior Publication Data
US 2018/0124027 A1 May 3, 2018

Related U.S. Application Data

(60) Provisional application No. 62/415,632, filed on Nov. 1, 2016.

(51) Int. Cl.
*H04L 29/06* (2006.01)
*H04L 29/08* (2006.01)
*G06F 21/62* (2013.01)
*G06F 21/60* (2013.01)
*G06F 16/957* (2019.01)

(52) U.S. Cl.
CPC .......... *H04L 63/061* (2013.01); *G06F 16/957* (2019.01); *G06F 21/60* (2013.01); *G06F 21/6209* (2013.01); *G06F 21/6263* (2013.01); *H04L 63/0428* (2013.01); *H04L 67/1027* (2013.01); *H04L 67/142* (2013.01); *H04L 67/146* (2013.01)

(58) Field of Classification Search
CPC . H04L 67/1027; H04L 67/142; H04L 67/146; G06F 21/60; G06F 21/6263
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Thaddeus J Plecha
(74) *Attorney, Agent, or Firm* — Weaver Austin Villeneuve & Sampson LLP

(57) ABSTRACT

Disclosed are some implementations of systems, apparatus, methods and computer program products for encrypting and securely storing session data during a browser session using a session-based cryptographic key. The session data may be decrypted during the browser session or other browser sessions using the session-based cryptographic key or other backwards compatible session-based cryptographic keys. In addition, session-based cryptographic keys may be shared among browser sessions to enable encrypted session data to be decrypted across page refreshes and browser tabs.

20 Claims, 11 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,116,660 B2 | 10/2018 | Chasman et al. |
| 10,129,258 B2 | 11/2018 | Chasman et al. |
| 10,146,597 B2 | 12/2018 | Pack, III et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0112154 A1* | 8/2002 | Wallace, Jr. ........ H04L 63/0428 713/153 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0198379 A1* | 9/2005 | Panasyuk ............ G06F 21/31 709/239 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0332836 A1* | 12/2010 | Shen ............... H04L 63/0435 713/171 |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0134723 A1* | 5/2015 | Kansal ............ H04L 67/1031 709/203 |
| 2015/0135198 A1 | 5/2015 | Pack, III et al. |
| 2015/0142596 A1 | 5/2015 | Jakobson et al. |
| 2015/0172563 A1 | 6/2015 | Jakobson et al. |
| 2016/0173464 A1* | 6/2016 | Wang ............... H04L 61/2589 713/171 |
| 2018/0060371 A1 | 3/2018 | Venkiteswaran et al. |
| 2018/0109434 A1 | 4/2018 | Venkiteswaran et al. |
| 2018/0152450 A1 | 5/2018 | Chasman et al. |
| 2018/0152456 A1 | 5/2018 | Chasman et al. |

* cited by examiner

FACILITATING ENCRYPTED PERSISTENT STORAGE IN BROWSERS

PRIORITY DATA

This application claims priority of commonly assigned U.S. Provisional Application No. 62/415,632, entitled "Encrypted Persistent Storage in Browser," by Venkiteswaran et al., filed on Nov. 1, 2016, which is incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to facilitating encrypted persistent storage in browsers. More specifically, this patent document discloses techniques for facilitating the persistent storage of data in a secure manner across browser sessions and the use of cryptographic keys across browser sessions to decrypt encrypted session data.

BACKGROUND

In a web application environment, customer data is typically stored in a data center. Since security of the customer data is often paramount to many customer situations, the customer data cannot be stored outside the data center. As a result, a browser operating on a client device typically requests customer data from a web server each time customer data is displayed. This leads to inefficiencies because the client device must make multiple data requests to the server in order to retrieve data across browser tabs and page refreshes.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
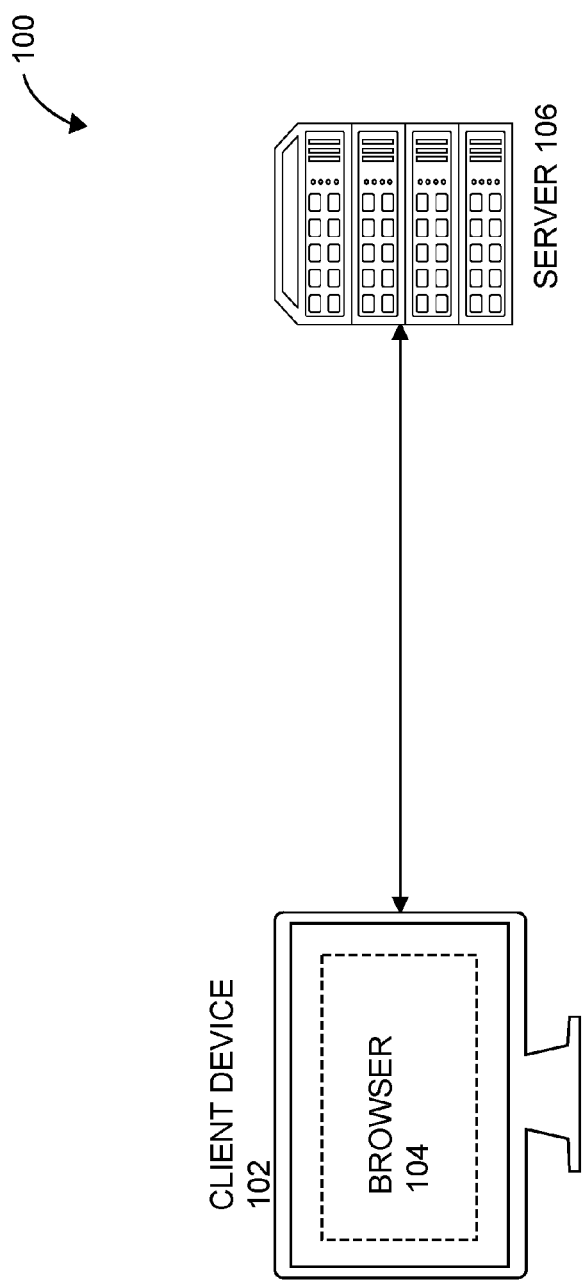
FIG. 1 shows an example of a web application environment 100, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Typically, web applications do not enable data maintained in data centers to be persisted locally at client devices. Furthermore, browsers generally do not support encrypted data storage. As a result, when multiple instances of a web application are simultaneously active on a given client device, the client device must typically re-fetch data from a web server for each instance of the web application. These inefficiencies can impact the operation of the web server, as well as the client device.

Various implementations described or referenced herein are directed to different methods, apparatus, systems, and computer program products for facilitating the persistent storage of data in a secure manner across browser sessions (e.g., page refreshes and browser tabs) of a web browser. The system may use a database such as an indexed database to provide structured persistent storage. In addition, the system may employ web cryptography in the browser to encrypt session data and decrypt encrypted session data stored in the structured persistent storage. The system may utilize cryptographic logic to generate cryptographic session-based keys and utilize storage service abstractions of how and where to store data. The cryptographic session keys may be stored in ephemeral memory to ensure that encrypted data is stored in a secure manner.

The system may encrypt cached data at rest and persist it to disk. In accordance with various implementations, the browser stores encrypted session data in a browser cache. In some implementations, the system may use an indexed database to store encrypted session data. Encrypted session data stored in the indexed database may be accessed via an application programming interface (API).

Session data may include data such as customer data. For example, the data may be obtained from fields of records stored in a customer database. As another example, the data may include metadata such as information indicating locations at which the data is stored, either locally or remotely.

In accordance with various implementations, the system may derive cryptographic keys from session identifiers. When a web application is booted, the web application may execute a per-session request for a cryptographic key that is derived from the user's session and which is linked to the lifecycle of the session data. In a typical use scenario, there is one main authentication session and different, subsequent browser sub-sessions derived from that main authentication session. The system may include an abstraction logic layer to access browser cryptography logic and encrypted session data across browser tabs and page refreshes. In addition, the system may implement key storage logic to accelerate performance during browser sessions of a web browser, resulting in fewer server requests.

By way of illustration, John is an employee at an organization, Pyramid Construction, Inc. John logs in to a web site of the organization to access a web application that provides information regarding business opportunities of the organization. John accesses a user interface (UI) using a browser of a client device to view data pertaining to a business opportunity, XYZ. John is viewing the information via a web page rendered via a display when the browser crashes. After the browser crashes, the data will still be accessible, whereas with conventional approaches the data will have been purged and is no longer accessible to the browser. The disclosed techniques may be applied to facilitate the encryption, retrieval, and decryption of session data across browser sessions of a web browser, as will be described in further detail below.

FIG. 1 shows an example of a web application environment 100, in accordance with some implementations. A web application environment 100 generally includes a client device 102 (e.g., mobile phone, laptop, tablet, and personal computer), a browser 104 (e.g., Safari, Internet Explorer, Google Chrome, Mozilla Firefox, Opera), and a server 106 (e.g., LAMP, Windows server, etc). To improve the performance of web applications it is advantageous to store customer data locally at the client device 102. However, this has historically not been feasible, since there fails to be a mechanism for securely persisting customer data outside of the data center. This leads to inefficiencies because the client device 102 must make multiple data requests to the server 106 in order to retrieve data across browser tabs and page refreshes.

In one typical use scenario, a user completes a user authentication process to use the web application and receives a session ID. The client device 102 may transmit a request for a cryptographic key, and a cryptographic key may be generated for use in encrypting session data received during browser sessions associated with the session ID. Encrypted session data may be stored to disk or ephemeral memory, depending on the browser capabilities.

If the browser closes or crashes during the session and is subsequently re-activated, the user may be automatically "re-authenticated." In some implementations, the re-authentication process may include determining whether the current browser session is a child of, or related to, the previous browser session. If such a relationship is determined, a new encryption key for the new session may be generated that is compatible with the encrypted data from the previous session. If the new session is not a child of, or related to, the previous session, a cryptographic key that is not compatible with the encrypted data from the previous session may be generated. As a result, the previously stored encrypted session data in the browser cache may become inaccessible, and the session data may be retrieved from the server again.

In some implementations, the browser may determine if a cryptographic key is valid by decrypting an encrypted sentinel value. This additional security check enables system administrators a greater degree of access controls over customer data. For example, a system administrator may execute control to disallow access to cached data while browser 104 is offline, rendering the cryptographic key invalid. In addition, a system administrator may further disallow the user to re-authenticate and retrieve the customer data from the server.

If the cryptographic key cannot decrypt the encrypted sentinel value, the browser may ascertain that the cryptographic key is not valid. Where the cryptographic key is determined to be invalid, the encrypted session data may become inaccessible and the encrypted session data may be flushed from the browser cache or database. After the session data has become inaccessible, the browser may request the session data from the server again.

Figure 2:
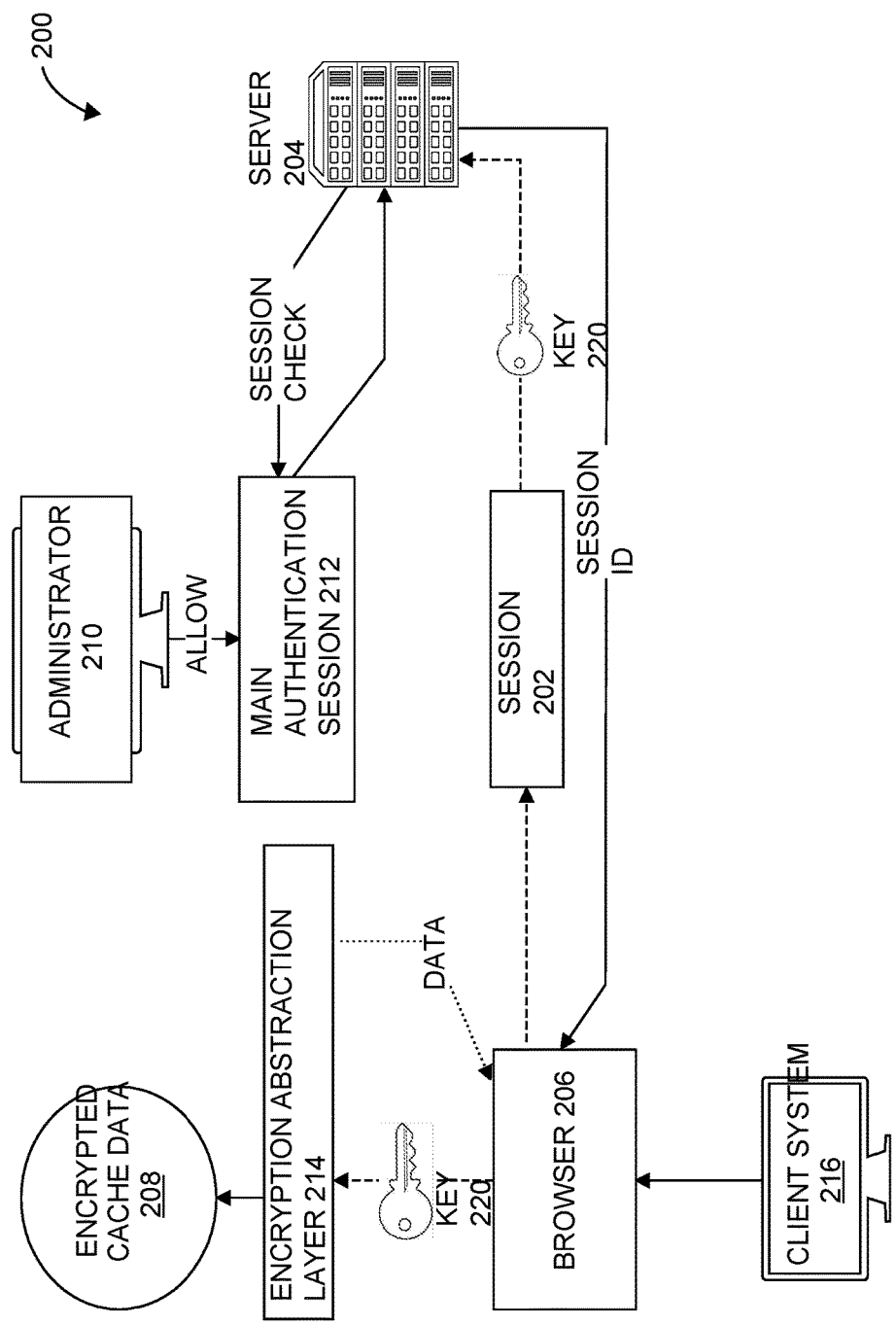
FIG. 2 shows an example of an aspect of a cross-session secure storage system 200, in accordance with some implementations.

FIG. 2 shows an example of an aspect of a cross-session secure storage system 200, in accordance with some implementations. As shown in this example, a cross-session secure storage system 200 includes a browser session 202 between a server 204 operated by an administrator 210 and a browser 206 executed by a client system 216 operated by a user. The browser session 202 may be linked to (e.g., related to) a main authentication session 212 via a common session identifier (ID) provided by server 204 to browser 206. The browser session 202 may utilize encrypted session data 208 that is encrypted and decrypted using a cryptographic key 220 via an encryption abstraction layer 214. Although a single browser session 202 of a web browser is illustrated in this example, encrypted session data 208 may also be encrypted and decrypted during another browser session of the web browser using cryptographic key 220 or another backwards compatible cryptographic key. The cross-session secure storage system 200 may be operated in accordance with a process for persistent encrypted storage in browser 206, as will be described in further detail below with reference to FIG. 3.

Figure 3:
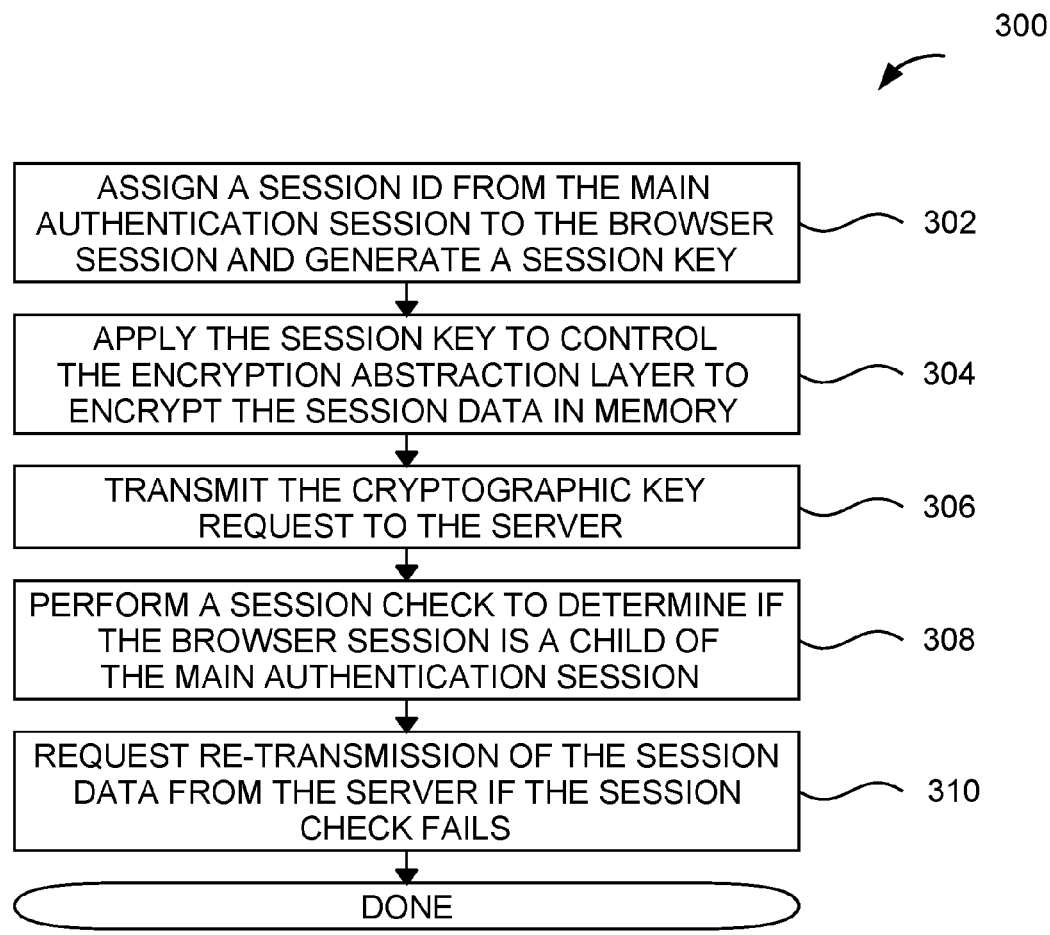
FIG. 3 shows a flowchart of an example of a method 300 for implementing persistent encrypted storage in browsers, in accordance with some implementations.

FIG. 3 shows a flowchart of an example of a method 300 for implementing persistent encrypted storage in web browsers, in accordance with some implementations. As shown in this example, a process for persistent encrypted storage in web browsers 300 may assign a session ID from a main authentication session to a browser session and a cryptographic key (e.g., a symmetric or asymmetric cryptographic key) associated with the session ID may be generated at 302. (The cryptographic key may be applied via an encryption abstraction layer to encrypt session data in memory at 304.

A subsequent browser session may be initiated, either automatically or in response to a user action. For example, a subsequent browser session may be initiated if the browser crashes. As another example, a subsequent browser session may be initiated in response to a page refresh. As yet another example, a subsequent browser session may be initiated in association with a browser tab.

During the subsequent browser session, the web browser may transmit a cryptographic key request to a server at 306. The server may perform a session check to determine if the browser session is a child of the main authentication session at 308. As described above, the session check may be performed to determine whether the cryptographic key is valid. In some implementations, the session check may include decrypting a dummy encrypted value (e.g., sentinel value) with the cryptographic key.

If the session check succeeds, previously encrypted session data may be retrieved from memory and decrypted using the cryptographic key. If the session check fails, the browser may request re-transmission of the session data from the server at 310. In some implementations, if the session check fails, the main authentication session may invalidate the cryptographic key, and the browser session may restart. Therefore, decryption of the session data in the memory may be dependent upon the session check succeeding.

Figure 4:
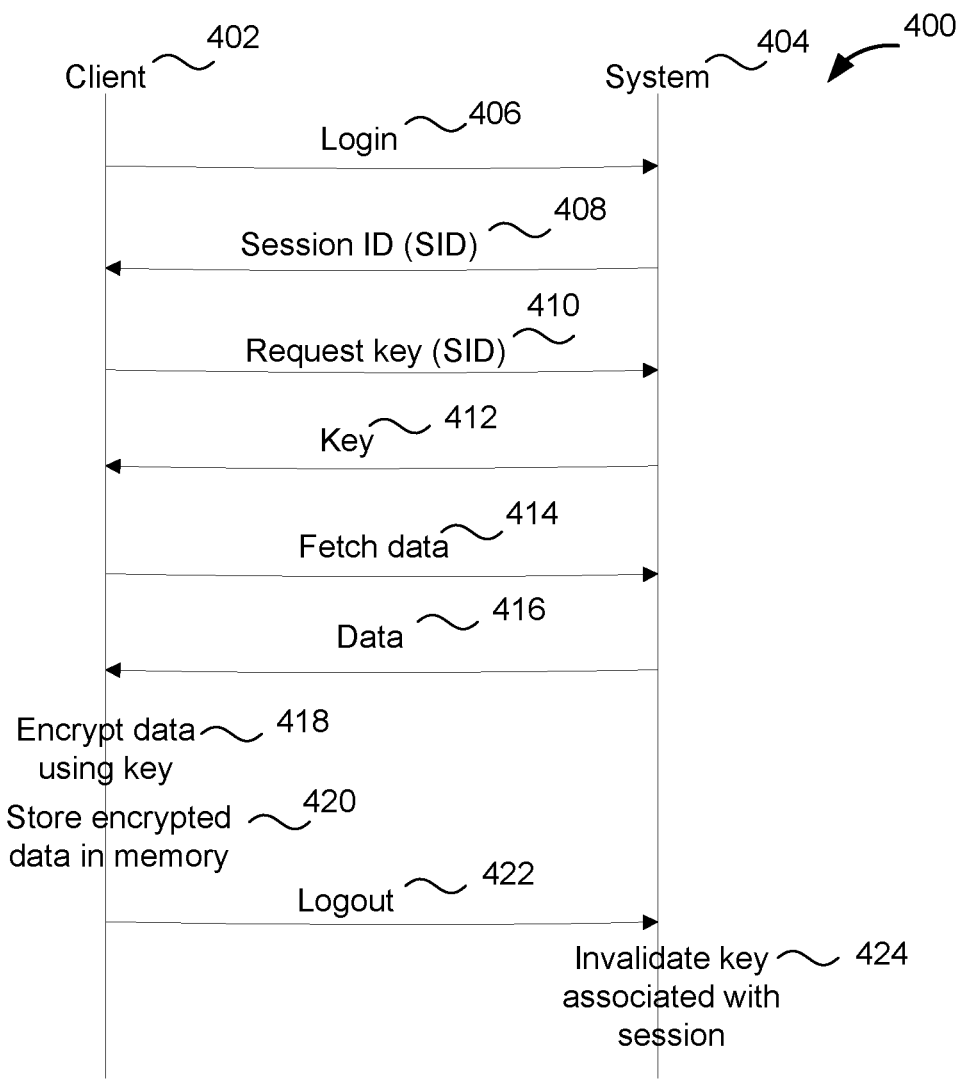
FIG. 4 shows a process flow diagram of an example of a method 400 for implementing persistent encrypted storage during a browser session, in accordance with some implementations.

FIG. 4 shows a process flow diagram of an example of a method 400 for implementing persistent encrypted storage during a browser session, in accordance with some implementations. Operations that may be performed between a client 402 and system 404 including a web server are described in further detail below. More particularly, a user of a client device 402 may complete login 406 to system 404. After the user has successfully completed a login process, system 404 may provide a session identifier (SID) at 408 to client 402. Client 402 may request a cryptographic key at 410 from system 404. For example, client 402 may transmit a key request that includes the SID, enabling system 404 to assign a cryptographic key for the session. System 404 may provide a cryptographic key at 412 to client 402. Client 402 may fetch data at 414 from system 404 during a browser session. After receiving session data at 416 from system 404, client 402 may encrypt the session data using the cryptographic key at 418 and store the encrypted data in memory at 420. For example, the encrypted data may be stored in a browser cache or indexed database. The encrypted data may subsequently be retrieved from memory and decrypted using the cryptographic key during the browser session or subsequent related browser sessions.

The user may choose to log out, as shown at 422. After the user has logged out, the system 404 may invalidate the session ID and/or cryptographic key associated with the session at 424. After the cryptographic key has been invalidated, the key may no longer be used to decrypt previously stored session data. In addition, the encrypted session data may be deleted. For example, the browser cache may be purged of the encrypted session data.

Figure 5:
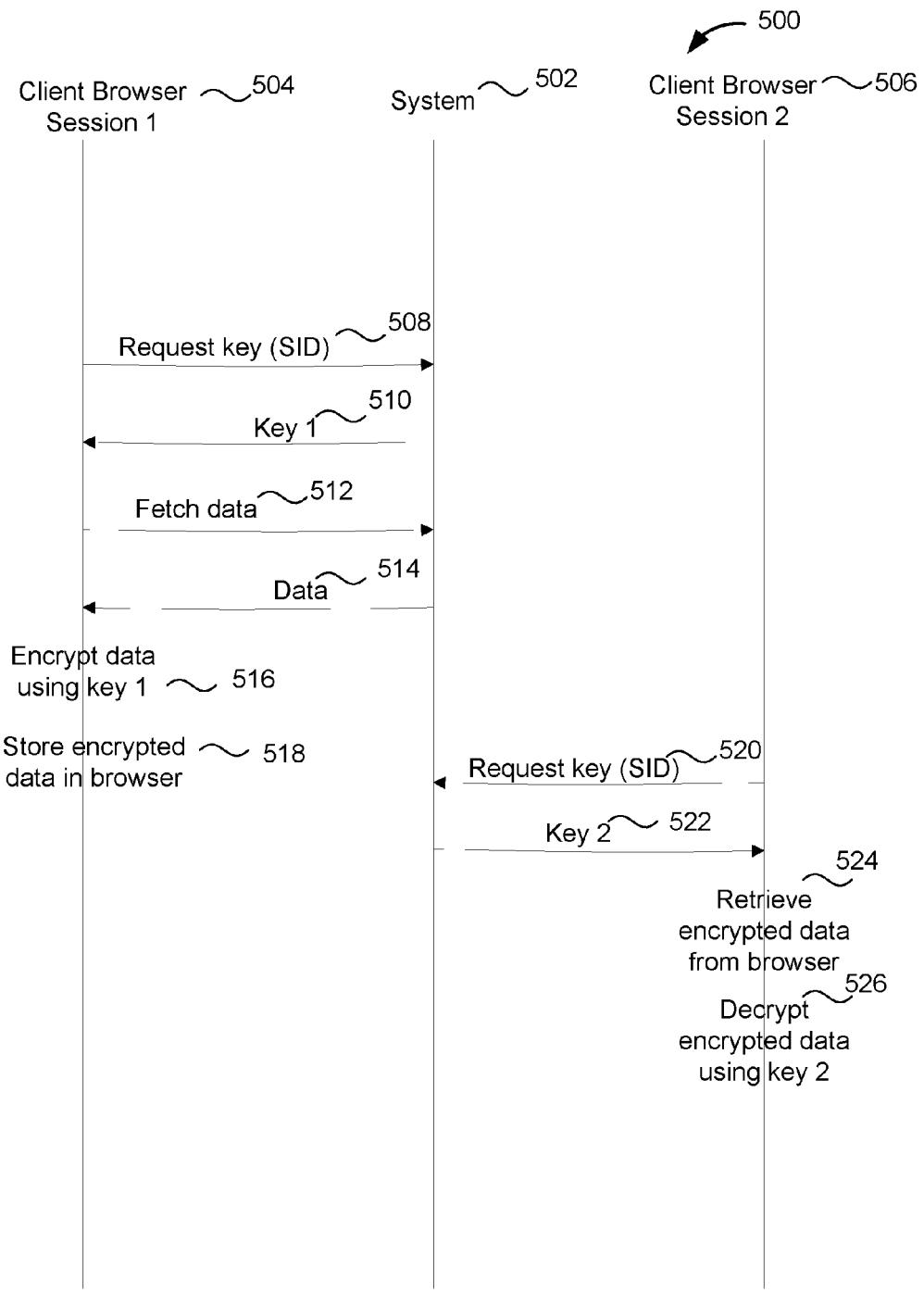
FIG. 5 shows a process flow diagram of an example of a method 500 for implementing persistent encrypted storage across browser sessions, in accordance with some implementations.

FIG. 5 shows a process flow diagram of an example of a method 500 for implementing persistent encrypted storage across browser sessions, in accordance with some implementations. Operations that may be performed by a system 502 including a web server and a client browser during a first browser session 504 and a second browser session 506 are described below. As shown in this example, during a first browser session 504 of a web browser, the client browser may send a cryptographic key request to system 502 at 508, where the cryptographic key request identifies a SID associated with the first browser session. The client browser may obtain a first cryptographic key associated with the session ID at 510. For example, the first cryptographic key may be a symmetric or asymmetric cryptographic key.

The client browser may fetch data during the first browser session at 512. After receiving session data at 514, the client browser may apply the first cryptographic key to generate encrypted session data at 516. The encrypted session data may be stored in memory at 518. For example, the encrypted session data may be stored in a memory of a browser (e.g., a browser cache).

A second browser session that is related to the first browser session may be initiated. For example, the second browser session may be initiated after a page refresh or after the user clicks on another tab within the web page. During the second browser session, the web browser may transmit a second cryptographic key request to the web server at 520. Since the second browser session may be associated with the SID of the first browser session, the second key request may include the SID. Responsive to the second cryptographic key request, the web browser may receive a second cryptographic key from the web server at 522.

In some implementations, the second cryptographic key may be backwards compatible with the first cryptographic key. For example, the second cryptographic key may be used to decrypt previously stored encrypted session data. During the second browser session, the web browser may retrieve the encrypted session data from the memory at 524. The encrypted session data may then be decrypted using the second cryptographic key at 526.

In some instances, a cryptographic key may be backwards compatible, but not forward compatible. In other words, a cryptographic key may be used to decrypt previously stored session data, but it may not be used to decrypt encrypted session data stored during subsequent browser sessions.

In some implementations, the browser may determine whether a particular cryptographic key is valid or "functional." In other words, the browser may determine whether a particular cryptographic key is configured to decrypt encrypted session data. In some implementations, the browser may determine whether a particular cryptographic key is valid (e.g., configured to decrypt encrypted session data) by decrypting an encrypted sentinel value with the cryptographic key. For example, the browser may determine whether the second cryptographic key is valid by decrypting an encrypted sentinel value with the second cryptographic key. If the cryptographic key is determined to be valid, the browser may decrypt previously encrypted session data using the cryptographic key. For example, if the second cryptographic key is determined to be valid, session data that was encrypted during the first browser session may be decrypted using the second cryptographic key.

Figure 6:
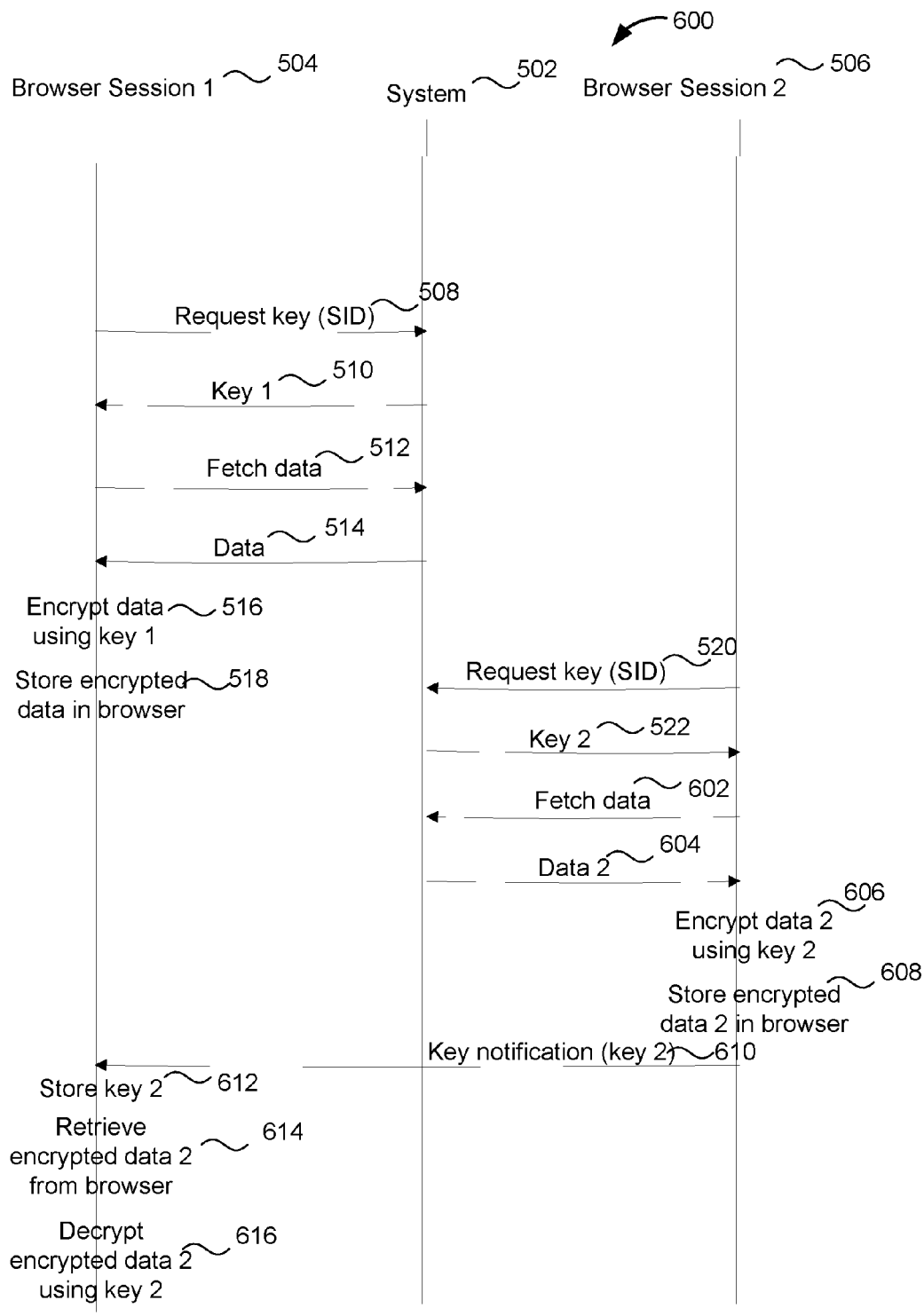
FIG. 6 shows a process flow diagram of an example of a method 600 for implementing cryptographic keys across browser sessions, in accordance with some implementations.

FIG. 6 shows a process flow diagram of an example of a method 600 for implementing cryptographic keys across browser sessions, in accordance with some implementations. As described above with reference to FIG. 5, two different browser sessions or instances may use different cryptographic keys across different instances of a web application. In this example, the first cryptographic key associated with the first browser session may be used to decrypt data that has been received and encrypted during the first browser session. Similarly, the second cryptographic key associated with the second browser session may be used to decrypt data that has been received and encrypted during the second browser session.

In some implementations, cryptographic keys associated with a particular session ID are backwards compatible, but are not forwards compatible. Thus, the second cryptographic key associated with the session ID may be used to decrypt session data that was encrypted during the first browser session, while the first cryptographic key associated with the session ID may not be used to decrypt session data that is encrypted during the second browser session.

In some implementations, all cryptographic keys that are generated in association with a particular SID are identical. However, even where the cryptographic keys that are generated in association a SID are identical, cryptographic keys may periodically be updated or "cycled" over time to increase the security with which session data is encrypted and stored. As a result, two different cryptographic keys associated with the same SID may be different from each other at a given point in time.

In accordance with various implementations, a second browser instance operating during the second browser session transmits the second cryptographic key to a first browser instance operating during the first browser session so that the first browser instance may decrypt session data that is encrypted during the second browser session. As shown in this example, the second browser instance may fetch session data at 602. After receiving session data 2 at 604, the second browser instance may apply the second cryptographic key to encrypt the session data 2 received during the second browser session at 606. After storing encrypted session data 2 at 608, encrypted session data 2 may be retrieved and decrypted using the second cryptographic key.

As shown in this example, the second browser instance may transmit a key notification including the second cryptographic key at 610 to the first browser instance, enabling the first browser instance to use the second cryptographic key to decrypt session data that was encrypted during the second browser session. For example, the second browser instance may transmit the key notification in response to obtaining the second cryptographic key. The first browser instance may store the second cryptographic key at 612. For example, the second cryptographic key may be stored in ephemeral memory. The first browser instance may retrieve encrypted data 2 (encrypted during the second browser session) from memory (e.g., a browser cache) at 614 and decrypt the encrypted data 2 at 616 using the second cryptographic key. In this manner, new or updated cryptographic keys may be communicated across browser instances operating during related browser sessions.

Figure 7:
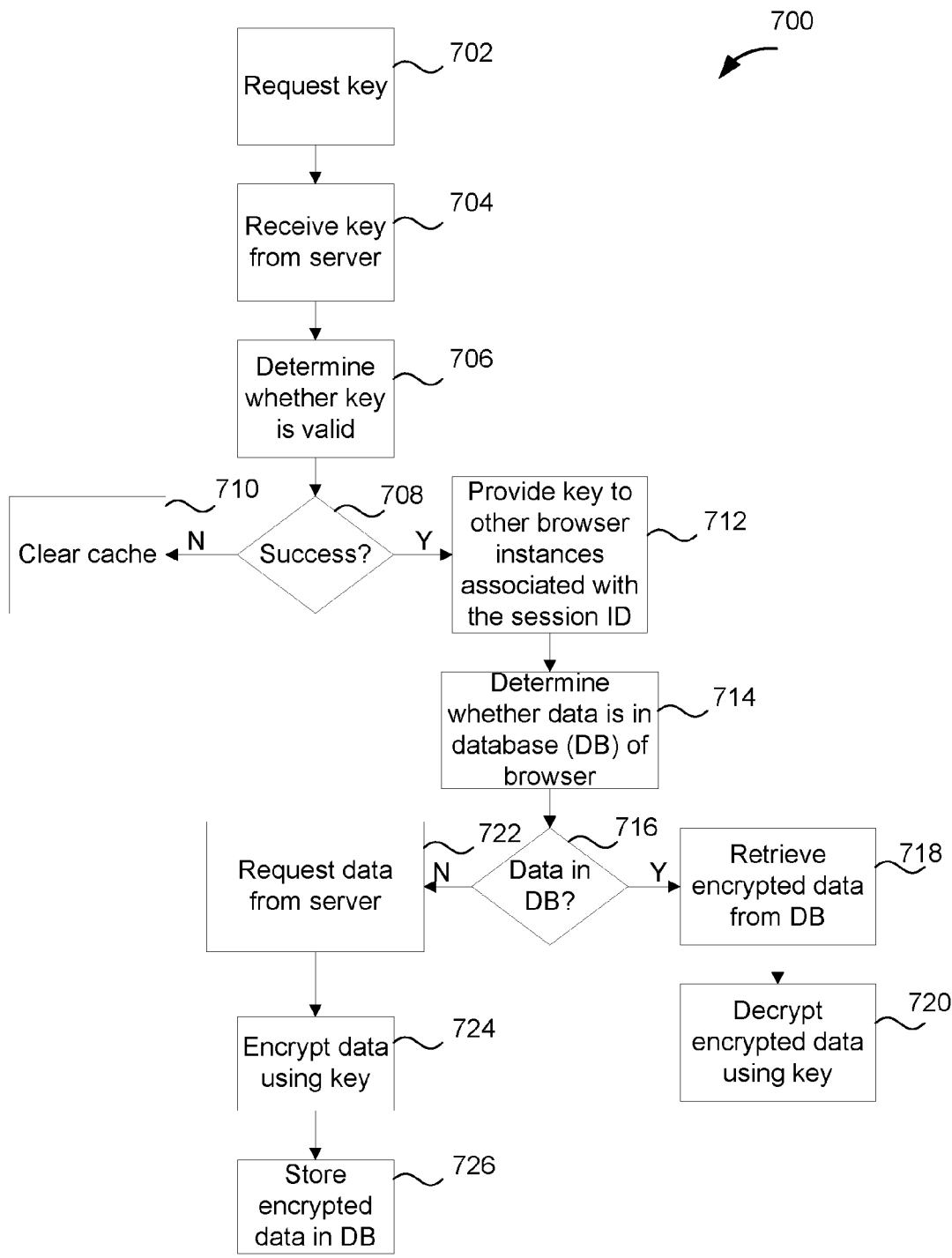
FIG. 7 shows a flowchart of an example of a method 700 for implementing persistent encrypted storage using a cryptographic key, in accordance with some implementations.

FIG. 7 shows a flowchart of an example of a method 700 for implementing persistent encrypted storage using a cryptographic key, in accordance with some implementations. As shown in this example, a web browser may transmit a cryptographic key request to a web server at 702 to request a cryptographic key associated with a particular Session ID. After the web browser receives a cryptographic key associated with the Session ID at 704 from the web server, the web browser may attempt to decrypt previously encrypted session data. However, it is possible that an administrator has disallowed access to cached data by invalidating the cryptographic key.

In accordance with various implementations, the browser may periodically determine whether the cryptographic key is valid at 706. In some implementations, the browser may communicate with the web server to determine whether the cryptographic key is valid. In further implementations, the web browser may determine whether the cryptographic key is valid by determining whether the cryptographic key decrypts a sentinel value within a database.

If the web browser determines that the cryptographic key is not valid (e.g., the cryptographic key has not successfully decrypted the sentinel value) at 708, the web browser may delete the encrypted session data (e.g., by clearing a browser cache) at 710. The web browser may subsequently request session data from the web server.

As described above, a browser instance operating during a browser session may transmit a cryptographic key to other browser instances operating during "related" browser sessions (e.g., other browser sessions associated with the same session ID). In some implementations, if the cryptographic key is determined to be valid, the browser instance may transmit the cryptographic key to other browser instance(s) associated with the session ID at 712. In addition, the web browser may determine whether session data associated with the session ID is in memory of the client device at 714. For example, the web browser may check whether session data associated with the session ID is in a browser cache or database of the web browser. If the browser determines at 716 that the session data associated with the session ID is in the memory, the browser may retrieve the encrypted session data from the memory at 718 and decrypt the encrypted session data using the cryptographic key at 720. If the web browser determines that the session data associated with the session ID is not in memory, the browser may request the session data from a web server at 722, encrypt the session data using the cryptographic key at 724, and store the encrypted session data in the memory (e.g., browser cache or database) at 726.

Figure 8:
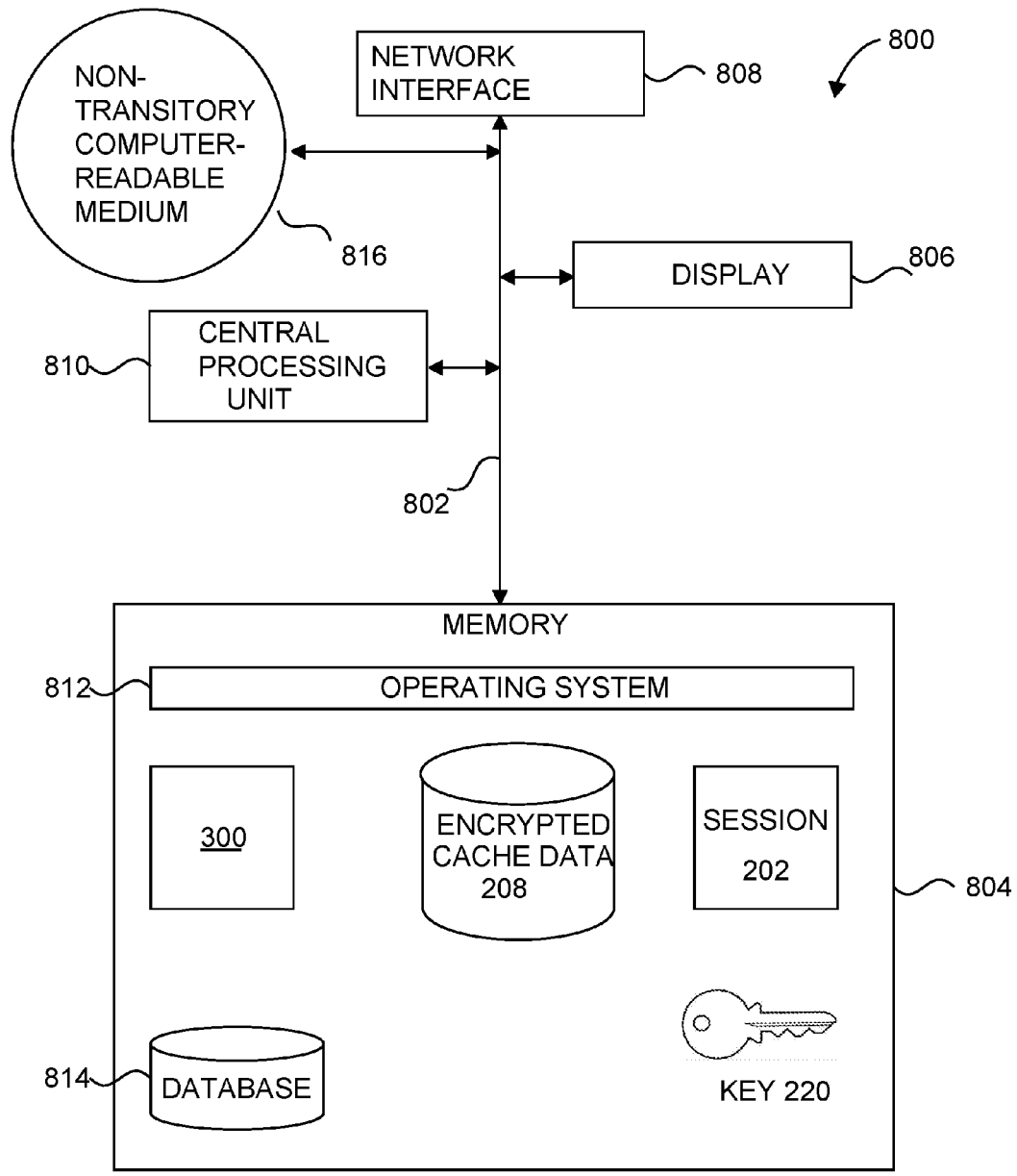
FIG. 8 shows an example of a system 800, in accordance with some implementations.

FIG. 8 shows an example of a system 800, in accordance with some implementations. In various embodiments, system 800 may include one or more physical and/or logical devices that collectively provide the functionalities described herein. In some embodiments, system 800 may comprise one or more replicated and/or distributed physical or logical devices.

In some embodiments, system 800 may include one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like. In this example, system 800 includes a bus 802 interconnecting several components including a network interface 808, a display 806, a central processing unit 810, and a memory 804.

Memory 804 generally comprises a random access memory ("RAM") and permanent non-transitory mass storage device, such as a hard disk drive or solid-state drive. Memory 804 may store an operating system 812. These and other software components may be loaded into memory 804 of system 800 using a drive mechanism (not shown) associated with a non-transitory computer-readable medium 816, such as a floppy disc, tape, DVD/CD-ROM drive, memory card, or the like.

Memory 804 may include a database 814 such as an indexed database. In some embodiments, system 800 may communicate with database 814 via network interface 808, a storage area network ("SAN"), a high-speed serial bus, and/or via the other suitable communication technology.

In some implementations, database 814 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

In various implementations, system 800 may include a desktop PC, server, workstation, mobile phone, laptop, tablet, set-top box, appliance, or other computing device that is capable of performing operations such as those described herein. In some implementations, system 800 may include many more components than those shown in FIG. 8. However, it is not necessary that all of these generally conventional components be shown in order to disclose an illustrative embodiment.

Collectively, the various tangible components or a subset of the tangible components may be referred to herein as "logic" configured or adapted in a particular way, for example as logic configured or adapted with particular software or firmware. "Logic" may refer to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. "Hardware" refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

Various implementations described or referenced herein are directed to different methods, apparatus, systems, and computer program products for facilitating the encrypted persistent storage of session data across browser sessions. Some but not all of the techniques described or referenced herein are implemented using or in conjunction with a customer relationship management (CRM) system or other database management system. CRM systems have become a popular way to manage and analyze customer interactions and data throughout the business lifecycle. Salesforce.com, Inc. is a provider of CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud.

Some CRM systems can be implemented in various settings, including organizations. For instance, a CRM system can be implemented to provide database access to users within an enterprise such as a company or business partnership, or a group of users within such an organization. For instance, employee users in a division of a business organization may share data with users in another division of the business organization. In the example of a multi-tenant database system, each organization or group within the organization can be a respective tenant of the system, as described in greater detail below. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as customer sales data for a potentially much greater number of customers.

Where there are multiple tenants, a user is typically associated with a particular tenant. For example, a user could be a salesperson of a company, which is a tenant of the database system that provides a database service.

In some implementations, data objects in the form of CRM records such as cases, accounts, or opportunities are stored in a database system. Updates to a record may include any change to a record. Examples of record updates include field changes in the record, updates to the status of a record, as well as the creation or deletion of the record itself.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get.

In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

A record can also have a status, the update of which can be provided by an owner of the record or other users having suitable write access permissions to the record. The owner can be a single user, multiple users, or a group.

In various implementations, an event can be an update of a record and/or can be triggered by a specific action by a user. Which actions trigger an event can be configurable.

Some non-limiting examples of systems, apparatus, and methods are described below for implementing database systems and enterprise level networking systems in conjunction with the disclosed techniques. Such implementations can provide more efficient use of a database system. Data may be synchronized between a database system of a primary organization and a database system of a secondary organization. Data synchronization may be suspended and resumed, as described above.

Figure 9A:
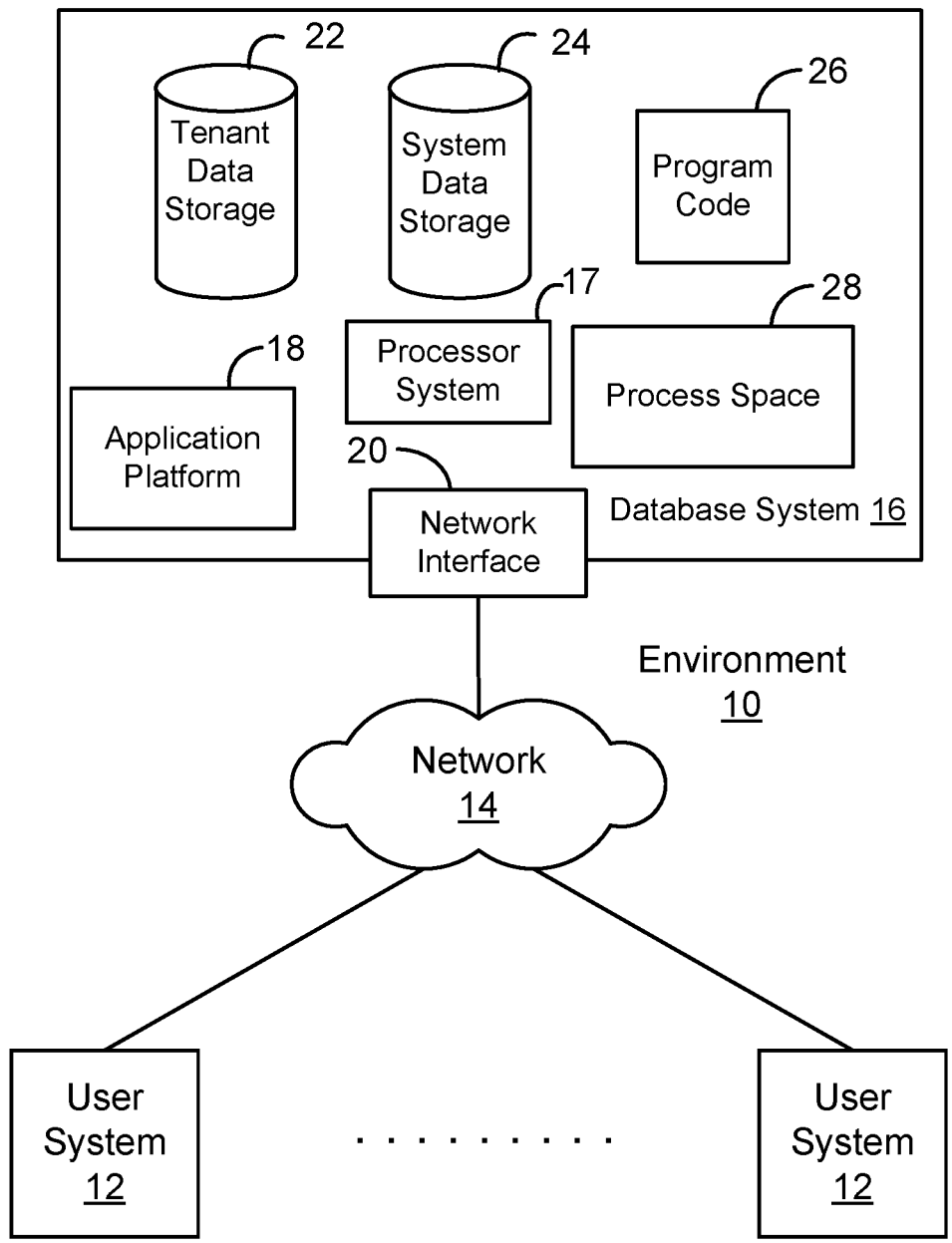
FIG. 9A shows a block diagram of an example of an environment 10 in which an on-demand database service can be used in accordance with some implementations.

FIG. 9A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 9A (and in more detail in FIG. 9B) user systems 12 might interact via a network 14 with an on-demand database service, which is implemented in the example of FIG. 9A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creating, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 9A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation of applications, storage of the applications into one or more database objects and executing of the applications in a virtual machine in the process space of the system 16.

Figure 9B:
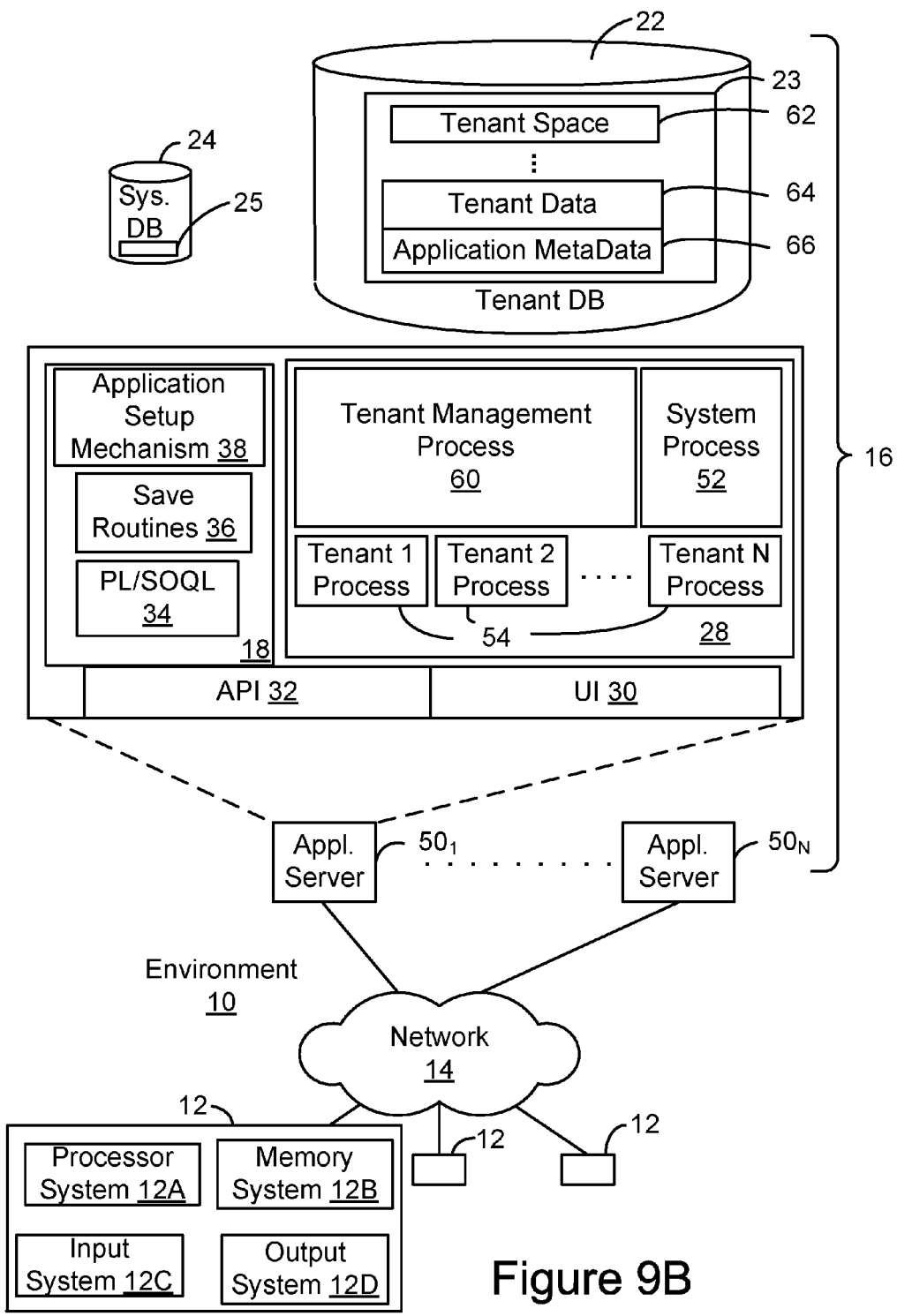
FIG. 9 B shows a block diagram of an example of some implementations of elements of FIG. 9A and various possible interconnections between these elements.

One arrangement for elements of system 16 is shown in FIGS. 9A and 9B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 9A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer." User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 9B shows a block diagram of an example of some implementations of elements of FIG. 9A and various possible interconnections between these elements. That is, FIG. 9B also illustrates environment 10. However, in FIG. 9B elements of system 16 and various interconnections in some implementations are further illustrated. FIG. 9B shows that user system 12 may include processor system 12A, memory system 12B, input system 12C, and output system 12D. FIG. 9B shows network 14 and system 16. FIG. 9B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 9A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 9B, system 16 may include a network interface 20 (of FIG. 9A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc. can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and/or update system-level or tenant-level data from system 16, which may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data (e.g., data item) for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
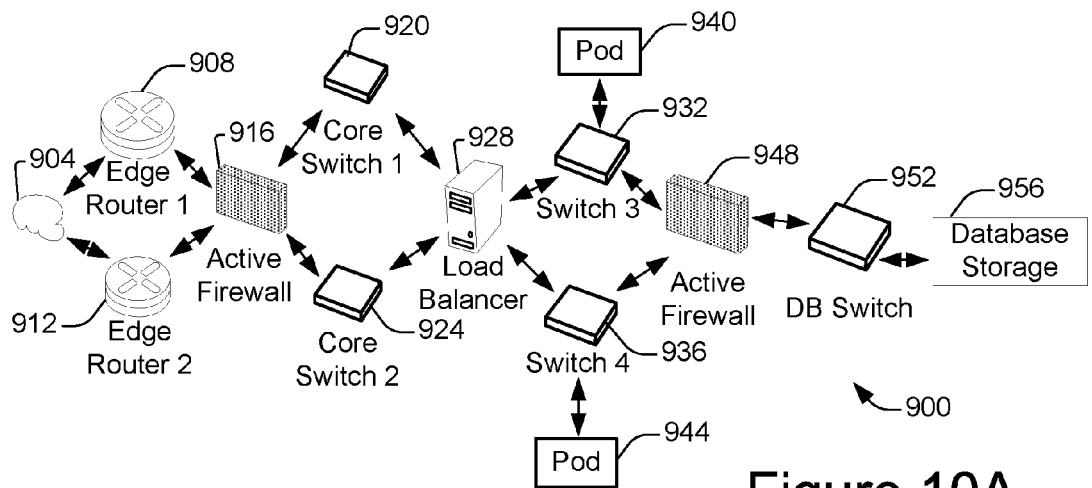
FIG. 10A shows a system diagram of an example of architectural components of an on-demand database service environment 900, in accordance with some implementations.

FIG. 10A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 10B:
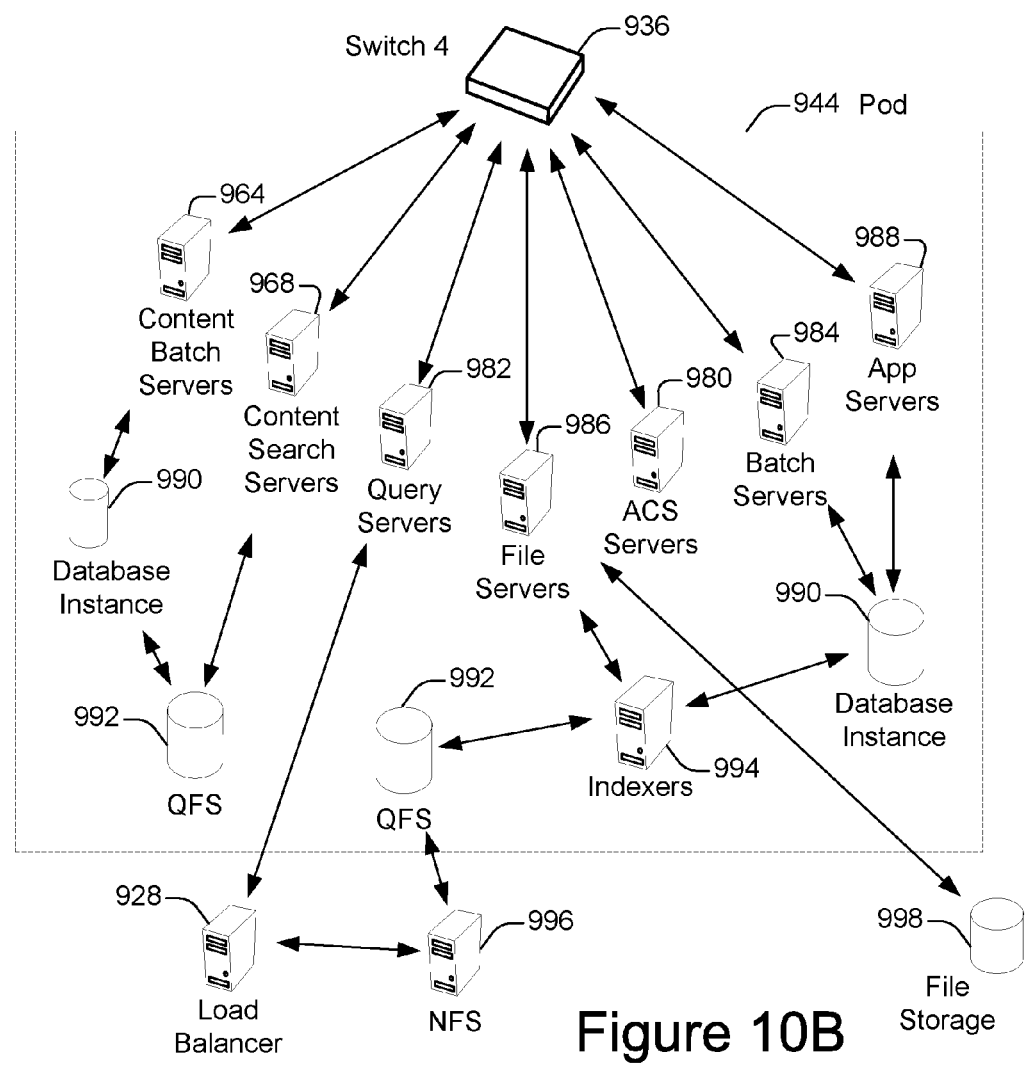
FIG. 10B shows a system diagram further illustrating an example of architectural components of an on-demand database service environment, in accordance with some implementations.

As shown in FIGS. 10A and 10B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 10A and 10B, some implementations of an on-demand database service environment may include anywhere from one to many devices of each type. Also, the on-demand database service environment need not include each device shown in FIGS. 10A and 10B, or may include additional devices not shown in FIGS. 10A and 10B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 10B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIG. 10B.

FIG. 10B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs. In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 8A and 8B include a hardware and/or software framework configurable to execute procedures using programs, routines, scripts, etc. Thus, in some implementations, one or more of application servers $50_1$-$50_N$ of FIG. 9B can be configured to initiate performance of one or more of the operations described above with reference to FIGS. 1A-7D by instructing another computing device to perform an operation. In some implementations, one or more application servers $50_1$-$50_N$ carry out, either partially or entirely, one or more of the disclosed operations described with reference to FIGS. 1A-7D. In some implementations, app servers 988 of FIG. 10B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein, including operations described above with reference to FIG. 5 In alternative implementations, two or more app servers 988 may cooperate to perform or cause performance of such operations. Any of the databases and other storage facilities described above with reference to FIGS. 9A, 9B, 10A and 10B can be configured to store lists, articles, documents, records, files, and other objects for implementing the operations described above with reference to FIG. 5. For instance, lists of published fields associated with corresponding connections can be maintained in tenant data storage 22 and/or system data storage 24 of FIGS. 9A and 9B. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 9A, 9B, 10A and 10B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computing device comprising:
   a memory; and
   a processor configured to:
      during a first browser session of a web browser situated at the computing device, obtain a first cryptographic key, the first browser session being associated with a session identifier (ID);
      during the first browser session of the web browser, obtain session data;
      apply the first cryptographic key to the session data to generate encrypted session data;
      store the encrypted session data in the memory;
      during a second browser session of the web browser, transmit a cryptographic key request to a server, the second browser session being associated with the session ID;
      responsive to the cryptographic key request, receive a second cryptographic key from the server;
      retrieve the encrypted session data from the memory; and
      decrypt the encrypted session data using the second cryptographic key.

2. The computing device as recited in claim 1, the processor being further configured to:
   determine whether the second cryptographic key is configured to decrypt the encrypted session data;
   wherein decrypting the encrypted session data using the second cryptographic key is performed in response to determining that the second cryptographic key is configured to decrypt the encrypted session data.

3. The computing device as recited in claim 2, the processor being further configured to determine whether the second cryptographic key is configured to decrypt the encrypted session data by
   decrypting an encrypted sentinel value with the second cryptographic key.

4. The computing device as recited in claim 1, wherein the first cryptographic key and the second cryptographic key are stored in ephemeral memory.

5. The computing device as recited in claim 1, wherein the memory comprises an indexed database, and wherein the encrypted session data is stored in the indexed database.

6. The computing device as recited in claim 1, wherein the memory comprises a browser cache, and wherein the encrypted session data is stored in the browser cache.

7. The computing device as recited in claim 1, the processor being further configured to:
   transmit, by a second browser instance associated with the second browser session, the second cryptographic key to a first browser instance associated with the first browser session.

8. A computer program product comprising one or more non-transitory computer-readable media having computer program instructions stored therein, the computer program instructions capable of being executed by one or more processors, computer program instructions configurable to cause:
   during a first browser session of a web browser situated at a computing device, obtaining a first cryptographic key, the first browser session being associated with a session identifier (ID);
   during the first browser session of the web browser, obtaining session data;
   applying the first cryptographic key to the session data to generate encrypted session data;
   storing the encrypted session data in a memory of the computing device;
   during a second browser session of the web browser, transmitting a cryptographic key request to a server, the second browser session being associated with the session ID;
   responsive to the cryptographic key request, receiving a second cryptographic key from the server;
   retrieving the encrypted session data from the memory; and
   decrypting the encrypted session data using the second cryptographic key.

9. The computer program product as recited in claim 8, the computer program instructions further configurable to cause:
   determining whether the second cryptographic key is configured to decrypt the encrypted session data;
   wherein decrypting the encrypted session data using the second cryptographic key is performed in response to determining that the second cryptographic key is configured to decrypt the encrypted session data.

10. The computer program product as recited in claim 9, wherein determining whether the second cryptographic key is configured to decrypt the encrypted session data comprises:
    decrypting an encrypted sentinel value with the second cryptographic key.

11. The computer program product as recited in claim 8, wherein the first cryptographic key and the second cryptographic key are stored in ephemeral memory.

12. The computer program product as recited in claim 8, wherein the memory comprises an indexed database, and wherein the encrypted session data is stored in the indexed database.

13. The computer program product as recited in claim 8, wherein the memory comprises a browser cache, and wherein the encrypted session data is stored in the browser cache.

14. The computer program product as recited in claim 8, the computer program instructions further configurable to cause:
transmitting, by a second browser instance associated with the second browser session, the second cryptographic key to a first browser instance associated with the first browser session.

15. A method, comprising:
during a first browser session of a web browser situated at a computing device, obtaining a first cryptographic key, the first browser session being associated with a session identifier (ID);
during the first browser session of the web browser, obtaining session data;
applying the first cryptographic key to the session data to generate encrypted session data;
storing the encrypted session data in a memory of the computing device;
during a second browser session of the web browser, transmitting a cryptographic key request to a server, the second browser session being associated with the session ID;
responsive to the cryptographic key request, receiving a second cryptographic key from the server;
retrieving the encrypted session data from the memory; and
decrypting the encrypted session data using the second cryptographic key.

16. The method as recited in claim 15, further comprising:
determining whether the second cryptographic key is configured to decrypt the encrypted session data;
wherein decrypting the encrypted session data using the second cryptographic key is performed in response to determining that the second cryptographic key is configured to decrypt the encrypted session data.

17. The method as recited in claim 16, wherein determining whether the second cryptographic key is configured to decrypt the encrypted session data comprises:
decrypting an encrypted sentinel value with the second cryptographic key.

18. The method as recited in claim 15, wherein the memory comprises an indexed database, and wherein the encrypted session data is stored in the indexed database.

19. The method as recited in claim 15, wherein the memory comprises a browser cache, and wherein the encrypted session data is stored in the browser cache.

20. The method as recited in claim 15, the method further comprising:
transmitting, by a second browser instance associated with the second browser session, the second cryptographic key to a first browser instance associated with the first browser session.

* * * * *

UNITED STATES PATENT AND TRADEMARK OFFICE
CERTIFICATE OF CORRECTION

PATENT NO. : 10,447,672 B2  
APPLICATION NO. : 15/482638  
DATED : October 15, 2019  
INVENTOR(S) : Kevin Venkiteswaran et al.

Page 1 of 1

It is certified that error appears in the above-identified patent and that said Letters Patent is hereby corrected as shown below:

In the Claims

At Column 24 Claim 8, Line 31, insert --the-- between "processers," and "computer program"

Signed and Sealed this
Eleventh Day of May, 2021

Drew Hirshfeld
*Performing the Functions and Duties of the
Under Secretary of Commerce for Intellectual Property and
Director of the United States Patent and Trademark Office*